US012631597B2

(12) United States Patent　(10) Patent No.:　US 12,631,597 B2
Kim et al.　(45) Date of Patent:　May 19, 2026

(54) MICROPLASTIC CONCENTRATION MEASUREMENT SENSOR AND MICROPLASTIC CONCENTRATION MEASUREMENT SYSTEM USING THE SAME

(71) Applicant: KOREA ELECTRONICS TECHNOLOGY INSTITUTE, Seongnam-si (KR)

(72) Inventors: Jin Hyoung Kim, Uiwang-si (KR); Kyu Sik Shin, Seoul (KR); Cheol Ung Cha, Seoul (KR); Kwon Hong Lee, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 330 days.

(21) Appl. No.: 18/405,677

(22) Filed: Jan. 5, 2024

(65) Prior Publication Data

US 2024/0288380 A1　Aug. 29, 2024

(30) Foreign Application Priority Data

Feb. 24, 2023　(KR) ........................ 10-2023-0025155

(51) Int. Cl.
*G01N 29/22*　(2006.01)
*G01N 15/06*　(2006.01)
*G01N 22/00*　(2006.01)

(52) U.S. Cl.
CPC ........... *G01N 29/222* (2013.01); *G01N 15/06* (2013.01); *G01N 22/00* (2013.01); *G01N 2223/652* (2013.01); *G01N 2291/02416* (2013.01)

(58) Field of Classification Search
CPC .. G01N 29/222; G01N 15/0272; G01N 22/00; G01N 2291/02416; G01N 27/221;
(Continued)

(56) References Cited

U.S. PATENT DOCUMENTS

2021/0255083 A1　8/2021　Algre et al.
2023/0408396 A1 *　12/2023　Hanay ................ G01N 15/0266

FOREIGN PATENT DOCUMENTS

CN　　111257349 A　*　6/2020　............. G01N 22/00
CN　　113049882 A　*　6/2021　............. G01N 22/00
(Continued)

OTHER PUBLICATIONS

Machine translation of CN 111257349 (Year: 2020).*
(Continued)

*Primary Examiner* — Nathaniel J Kolb
(74) *Attorney, Agent, or Firm* — Knobbe, Martens, Olson & Bear, LLP

(57)　　　　　ABSTRACT

Proposed are a microplastic concentration measurement sensor and a microplastic concentration measurement system using the sensor. The sensor may include a fluidic channel layer having a microfluidic channel formed on an upper surface thereof, and a molding layer formed on the fluidic channel layer and having first through-holes located respectively above one end and other end of the microfluidic channel. The sensor may also include a first substrate layer formed on the molding layer and having second through-holes located respectively above the first through-holes. The sensor may further include a single line formed on an upper surface of the first substrate layer, a second substrate layer formed below the fluidic channel layer, and a resonant layer formed on a lower surface of the second substrate layer.

13 Claims, 6 Drawing Sheets

(58) Field of Classification Search
CPC ......... G01N 27/22; G01N 2035/00524; G01N
2223/652; G01N 1/4077
See application file for complete search history.

(56) References Cited

FOREIGN PATENT DOCUMENTS

| | | | | |
|---|---|---|---|---|
| CN | 114354653 | A | * | 4/2022 |
| JP | 2006-512092 | A | | 4/2006 |
| KR | 10-2010-0088931 | A | | 8/2010 |
| KR | 10-2131269 | B1 | | 7/2020 |
| KR | 10-2229764 | B1 | | 3/2021 |
| KR | 10-2021-0132476 | A | | 11/2021 |
| KR | 10-2401716 | B1 | | 5/2022 |
| KR | 10-2023-0007038 | A | | 1/2023 |

OTHER PUBLICATIONS

Machine translation of CN 113049882 (Year: 2021).*
Machine translation of CN 114354653 (Year: 2022).*
Notice of Allowance received in Korean Patent Application No.
10-2023-0025155 dated Jul. 30, 2024 in 11 pages.

* cited by examiner (a)

Resonant layer
(metamaterial pattern)

(b)

MICROPLASTIC CONCENTRATION MEASUREMENT SENSOR AND MICROPLASTIC CONCENTRATION MEASUREMENT SYSTEM USING THE SAME

CROSS REFERENCE TO RELATED APPLICATIONS

The present application claims priority to Korean Patent Application No. KR 10-2023-0025155 filed Feb. 24, 2023, the entire contents of which are incorporated herein for all purposes by this reference.

BACKGROUND

Technical Field

The present disclosure relates to measuring the concentration of microplastic. More specifically, the present disclosure relates to an economical and easy-to-use microplastic concentration measurement sensor and a microplastic concentration measurement system using the sensor.

Description of Related Technology

Microplastic refers to small pieces of plastic less than 5 mm in size. In general, microplastic is manufactured from scratch or created when plastic products break down.

SUMMARY

One aspect is a microplastic concentration measurement sensor that can accurately and easily identify the type and concentration of microplastic, and a microplastic concentration measurement system using the same.

Another aspect is a microplastic concentration measurement sensor that includes a fluidic channel layer having a microfluidic channel formed on an upper surface thereof; a molding layer formed on the fluidic channel layer and having first through-holes located respectively above one end and other end of the microfluidic channel; a first substrate layer formed on the molding layer and having second through-holes located respectively above the first through-holes; a single line formed on an upper surface of the first substrate layer; a second substrate layer formed below the fluidic channel layer; and a resonant layer formed on a lower surface of the second substrate layer.

The microfluidic channel may include an injection line portion forming one part of the microfluidic channel and shaped like a straight line, a discharge line portion forming another part of the microfluidic channel and shaped like a straight line, and an expanded portion connecting the injection line portion and the discharge line portion and formed to have a larger width than the injection line portion and the discharge line portion.

The microfluidic channel may further include a filter wall formed at least at a connection part with the discharge line portion in the expanded portion.

The filter wall may include a plurality of filter rods spaced apart from an inner surface of the expanded portion and arranged at regular intervals from each other.

The microplastic concentration measurement sensor may further include a pump connected to at least one of the injection line portion and the discharge line portion.

A portion of the single line located above the expanded portion may have a larger width than other portions of the single line.

The resonant layer may include a metamaterial pattern.

Another aspect is a microplastic concentration measurement system that includes the above-mentioned microplastic concentration measurement sensor; a preprocessing unit preprocessing a fluid; a fluid input unit supplying the fluid preprocessed by the preprocessing unit to the second through-hole located above one end of the microfluidic channel; a signal transmitter connected to one end of the single line and transmitting an RF signal to the single line; a signal receiver connected to other end of the single line and receiving the RF signal passing through the single line; a measuring unit measuring signals from the signal transmitter and the signal receiver; and a calculating unit calculating concentration of microplastic using the signals measured by the measuring unit.

The preprocessing unit may include an organic matter remover removing organic matter from the fluid, an inorganic matter separator performing specific gravity separation on the fluid that has passed the organic matter remover, and a floating matter collector collecting a floating microplastic from the fluid in the inorganic matter separator.

The fluid input unit may mix a dispersion liquid with the floating microplastic collected by the floating matter collector and supply a mixture to the second through-hole.

The calculating unit may calculate the concentration of microplastic by checking a resonance frequency shift of the received signal.

The calculating unit may determine the type of microplastic by checking a reflection coefficient of the transmitted signal.

The fluid input unit may supply the fluid to the second through-hole at a constant pressure.

According to the present disclosure, the microplastic concentration measurement sensor has high sensitivity to changes in dielectric properties depending on the concentration of microplastic, thus making it possible to accurately measure the concentration of microplastic.

In addition, the microplastic concentration measurement sensor can be manufactured based on a semiconductor manufacturing process, so it can be mass-produced at low cost. Also, since the concentration of microplastic can be measured through variation in RF signal characteristics according to changes in dielectric properties, the measurement work can be easily performed.

In addition, the microplastic concentration measurement sensor can further increase the accuracy of concentration measurement through the shape of the microfluidic channel and additional components such as the filter wall and the pump.

According to the present disclosure, the microplastic concentration measurement system is capable of identifying the type of microplastic in addition to the microplastic concentration.

DETAILED DESCRIPTION

Figure 1:
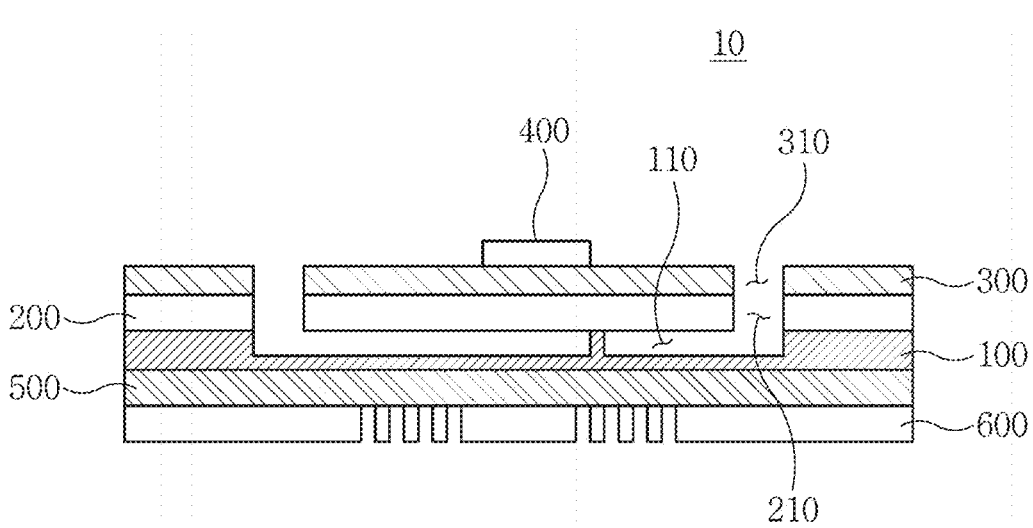
FIG. 1 is a cross-sectional view showing a microplastic concentration measurement sensor according to an embodiment of the present disclosure.

Microplastic may enter the human body through drinking water. In particular, nanometer-sized microplastic can penetrate the liver, heart, and brain, which can have harmful effects on the human body. In order to prevent damage caused by microplastic, it is necessary to check the concentration of microplastic contained in water. Typically, microplastic has been analyzed using optical analysis equipment. However, although optical analysis equipment has high accuracy in distinguishing types of microplastic, there is a problem in that it is not easy to calculate the concentration of microplastic because it calculates such concentration by visual inspection.

Now, embodiments of the present disclosure will be described in detail with reference to the accompanying drawings. However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Figure 2:
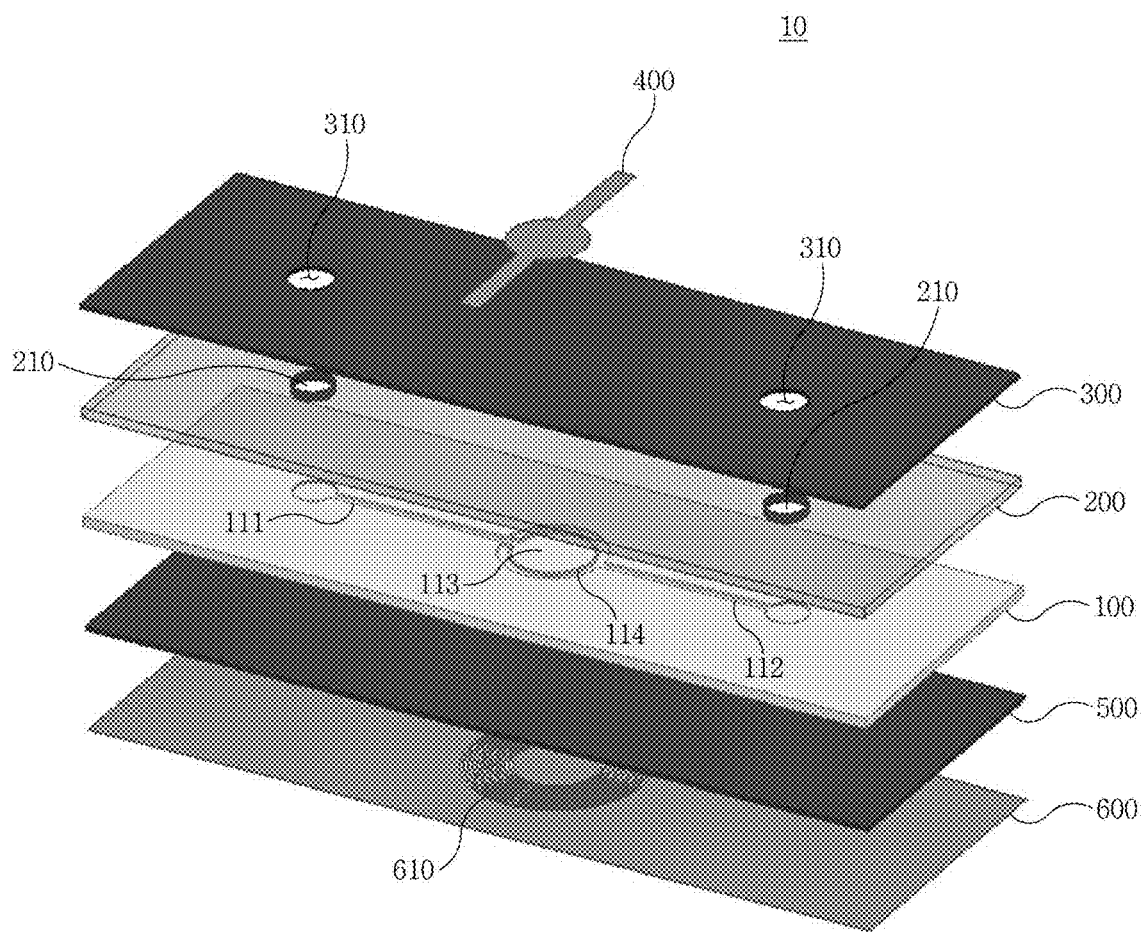
FIG. 2 is an exploded perspective view showing layers of a microplastic concentration measurement sensor according to an embodiment of the present disclosure.

FIG. 1 is a cross-sectional view showing a microplastic concentration measurement sensor 10 according to an embodiment of the present disclosure, and FIG. 2 is an exploded perspective view showing layers of a microplastic concentration measurement sensor 10 according to an embodiment of the present disclosure.

Referring to FIGS. 1 and 2, the microplastic concentration measurement sensor 10 includes a fluidic channel layer 100, a molding layer 200, a first substrate layer 300, a single line 400, a second substrate layer 500, and a resonant layer 600.

The fluidic channel layer 100 is made in the shape of a thin plate and has a microfluidic channel 110 formed on an upper surface thereof. The microfluidic channel 110 may have an overall straight shape. One end and the other end of the microfluidic channel 110 may be expanded to have a larger width than other parts. The fluidic channel layer 100 may be formed using a micro-electro mechanical system (MEMS) semiconductor process and, for example, may be made of a semiconductor wafer material such as silicon (Si).

The molding layer 200 is a layer formed on the fluidic channel layer 100 and protects the fluidic channel layer 100. The molding layer 200 has first through-holes 210 located respectively above one end and the other end of the microfluidic channel 110. Accordingly, the first through-hole 210 in one portion of the molding layer 200 can communicate with one end of the microfluidic channel 110, and the first through-hole 210 in another portion of the molding layer 200 can communicate with the other end of the microfluidic channel 110. For example, the molding layer 200 may be formed of a non-conductive material such as glass, epoxy, etc.

The first substrate layer 300 is a layer formed on the molding layer 200 and is a substrate for the single line 400 formed on an upper surface thereof. The first substrate layer 300 may be made of a typical printed circuit board (PCB) material such as glass fiber (FR4). The first substrate layer 300 has second through-holes 310 located respectively above the first through-holes 210. Accordingly, the second through-hole 310 in one portion of the first substrate layer 300 can communicate with one end of the microfluidic channel 110, and the second through-hole 310 in another portion of the first substrate layer 300 can communicate with the other end of the microfluidic channel 110. The second through-holes 310 are formed to be exposed on the upper surface of the microplastic concentration measurement sensor 10. Therefore, when fluid is injected into the second through-hole 310 formed in one portion of the first substrate layer 300, the fluid sequentially flows along the first through-hole 210 formed in one portion of the molding layer 200, the microfluidic channel 110 formed in the fluidic channel layer 100, and the first through-hole 210 formed in another portion of the molding layer 200. Then, the fluid is discharged through the second through-hole 310 formed in another portion of the first substrate layer 300.

The single line 400 is formed on the upper surface of the first substrate layer 300. The single line 400 has an overall straight shape and may be made of a conductive metal such as copper or gold. The single line 400 extends in a direction perpendicular to the direction in which the microfluidic channel 110 extends, and is located between the first through-holes 210 of the first substrate layer 300.

The second substrate layer 500 is a layer formed below the fluidic channel layer 100 and is a substrate for the resonant layer 600 positioned under the second substrate layer 500. Like the first substrate layer 300, the second substrate layer 500 may be made of a typical PCB material such as glass fiber (FR4).

The resonant layer 600 is formed on a lower surface of the second substrate layer 500 and generates a resonance phenomenon when a radio frequency (RF) signal is supplied to the single line 400. The resonant layer 600 may be made of a conductive metal such as copper or gold.

Figure 3:
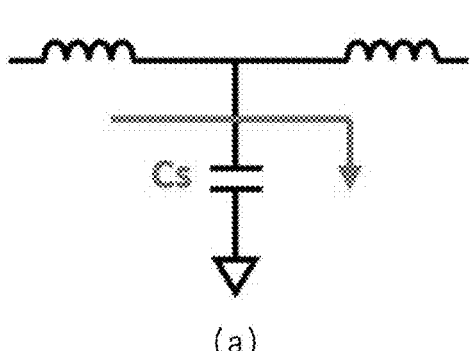
FIG. 3 is a diagram for explaining the operating principle of a microplastic concentration measurement sensor according to an embodiment of the present disclosure.
Figure 3:
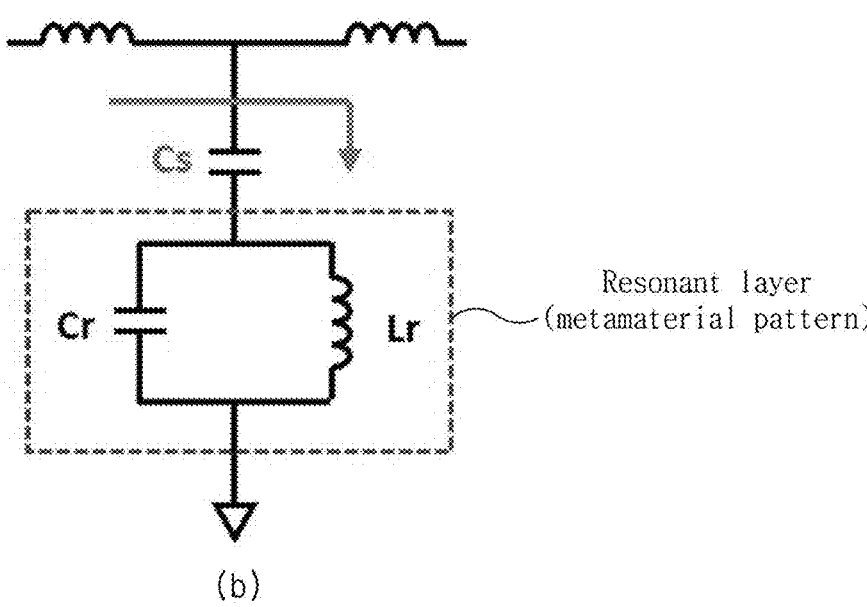

The microplastic concentration measurement sensor 10 according to the present disclosure described above has a structure using a microstrip transmission line. The single line 400 corresponds to a single line of the microstrip transmission line, and the resonant layer 600 corresponds to a ground plane of the microstrip transmission line. In particular, sensitivity to changes in capacitance is improved because of the resonance characteristics of the resonant layer 600. That is, when part (a) of FIG. 3 shows an equivalent circuit of a general microstrip transmission line, part (b) of FIG. 3 shows an equivalent circuit of the microplastic concentration measurement sensor 10 according to the present disclosure in which an inductor Lr is additionally formed by the resonant layer 600.

In other words, the microplastic concentration measurement sensor 10 according to the present disclosure can measure the concentration of microplastic based on the principle that dielectric properties are changed between the first substrate layer 300 and the second substrate layer 500 depending on the state of the fluid containing microplastic passing through the microfluidic channel 110. Since sensitivity to changes in dielectric properties is improved by the resonant layer 600, it is possible to accurately measure the concentration of microplastic.

In addition, the microplastic concentration measurement sensor 10 of the present disclosure can be manufactured based on a semiconductor manufacturing process, so it can be mass-produced at low cost. Also, unlike typical optical measurement technique, the microplastic concentration measurement sensor 10 of the present disclosure is capable of measuring the concentration of microplastic through variation in RF signal characteristics according to changes in dielectric properties, so the measurement work can be easily performed.

Figure 4:
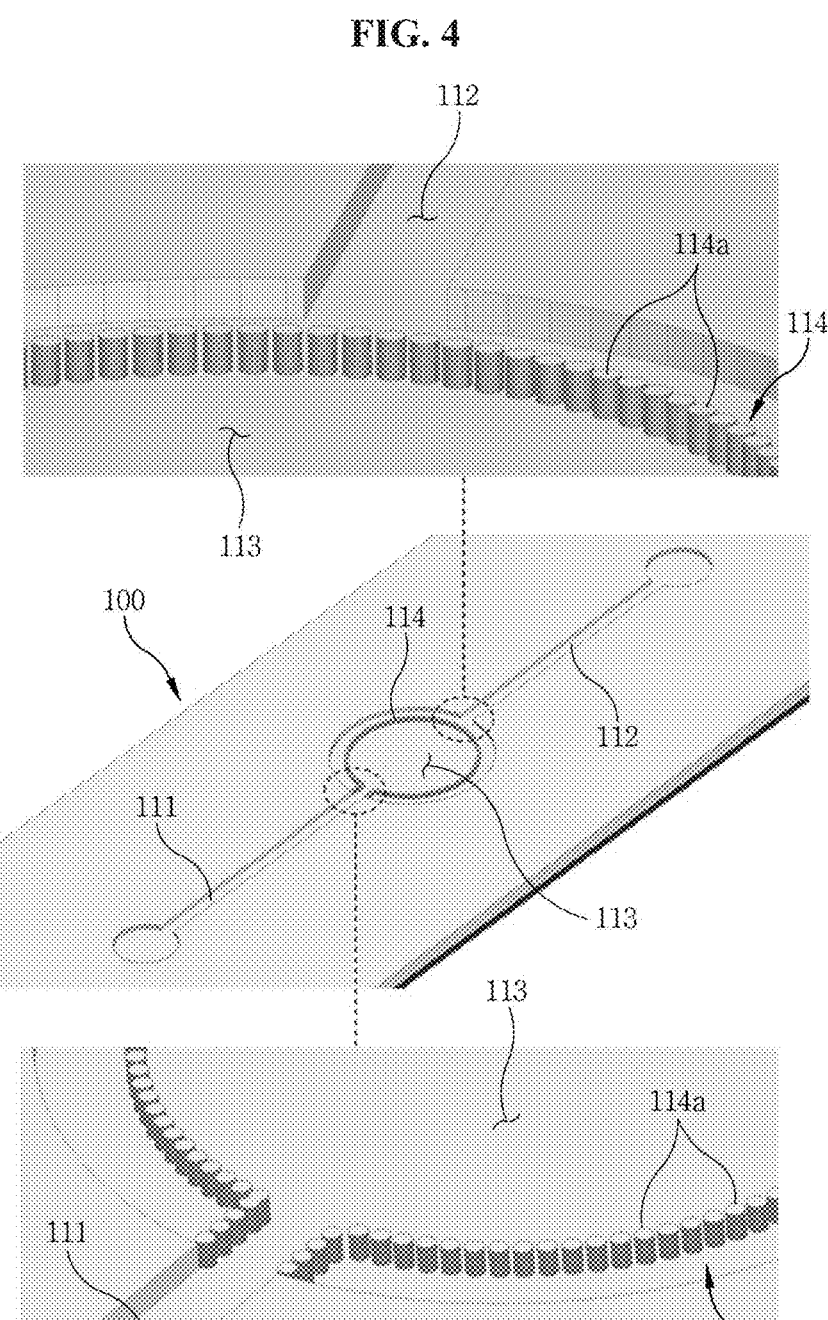
FIG. 4 is a perspective view showing a microfluidic channel of a microplastic concentration measurement sensor according to an embodiment of the present disclosure.

The microfluidic channel 110 may include an injection line portion 111, a discharge line portion 112, and an expanded portion 113. The perspective view of FIG. 4 shows this microfluidic channel 110 in detail.

The injection line portion 111 forms one part of the microfluidic channel 110 and is shaped like a straight line, and the discharge line portion 112 forms another part of the microfluidic channel 110 and is also shaped like a straight line. The expanded portion 113 connects the injection line portion 111 and the discharge line portion 112 and is formed to have a larger width than the injection line portion 111 and the discharge line portion 112. The expanded portion 113 may be, for example, circular.

Since microplastic particles are not uniformly dispersed at regular intervals in the fluid, if the microfluidic channel 110 is simply formed in a straight line, the measured value may vary at each moment. Therefore, the accuracy of measuring microplastic concentration may decrease.

However, when the expanded portion 113 is formed as in this embodiment, a large amount of fluid can flow through the expanded portion 113, thereby preventing problems caused by uneven distribution of microplastic particles. In other words, the accuracy of measuring microplastic concentration can be improved.

The microfluidic channel 110 may include a filter wall 114 within the expanded portion 113.

The filter wall 114 is a component that functions as a filter that allows fluid to pass but disallows microplastic to pass. In the expanded portion 113, the filter wall 114 is formed at least at a connection part with the discharge line portion 112. For example, the filter wall 114 is formed in a circular shape open toward the injection line portion 111. Therefore, the filter wall 114 guides the fluid containing microplastic from the injection line portion 111 into a space surrounded by the filter wall, filters the microplastic, and discharges only the fluid to the discharge line portion 112.

Since a greater amount of microplastic particles can be captured within the expanded portion 113 by the filter wall 114, the accuracy of measuring microplastic concentration can be further improved.

Meanwhile, when the filter wall 114 is provided, the amount of fluid injected into the microfluidic channel 110 and the amount of fluid discharged from the microfluidic channel 110 should be considered in measuring the concentration of microplastic.

Specifically, the filter wall 114 may be composed of a plurality of filter rods 114a, which are spaced apart from the inner surface of the expanded portion 113 and arranged at regular intervals from each other.

The interval (i.e., spacing) between the filter rods 114a can be determined to disallow microplastic of a certain size to pass through but to allow fluid to pass through, so the filter wall 114 can function as a filter.

The filter rods 114a may be spaced apart from the inner surface of the expanded portion 113 so that the fluid that has passed through the filter rods 114a can smoothly move to the discharge line portion 112.

The microplastic concentration measurement sensor 10 may further include a pump (not shown).

The pump may be connected to at least one of the injection line portion 111 and the discharge line portion 112. The pump on the injection line portion 111 generates pressure to push the fluid containing microplastic toward the expanded portion 113, and the pump on the discharge line portion 112 generates pressure to suck the fluid from the expanded portion 113.

The pump allows the fluid to flow smoothly through the injection line portion 111, etc., which has a narrow cross-section.

The pump may be formed through a MEMS semiconductor process, or may be formed as a syringe pump.

Figure 5:
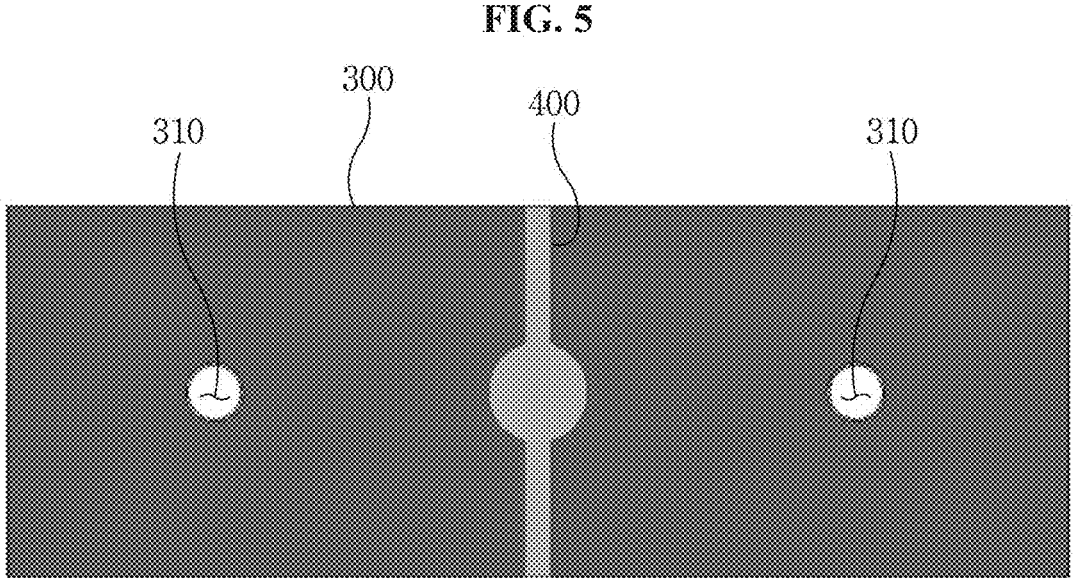
FIG. 5 is a plan view showing a single line of a microplastic concentration measurement sensor according to an embodiment of the present disclosure.

As shown in FIGS. 2 and 5, a portion of the single line 400 located above the expanded portion 113 may have a larger width than other portions of the single line 400. For example, the middle portion of the single line 400 may be formed in a circular shape with a diameter larger than the width of the other portions.

In this case, it is possible to more accurately detect changes in dielectric properties caused by microplastic located in the expanded portion 113 of the microfluidic channel 110.

Figure 6:
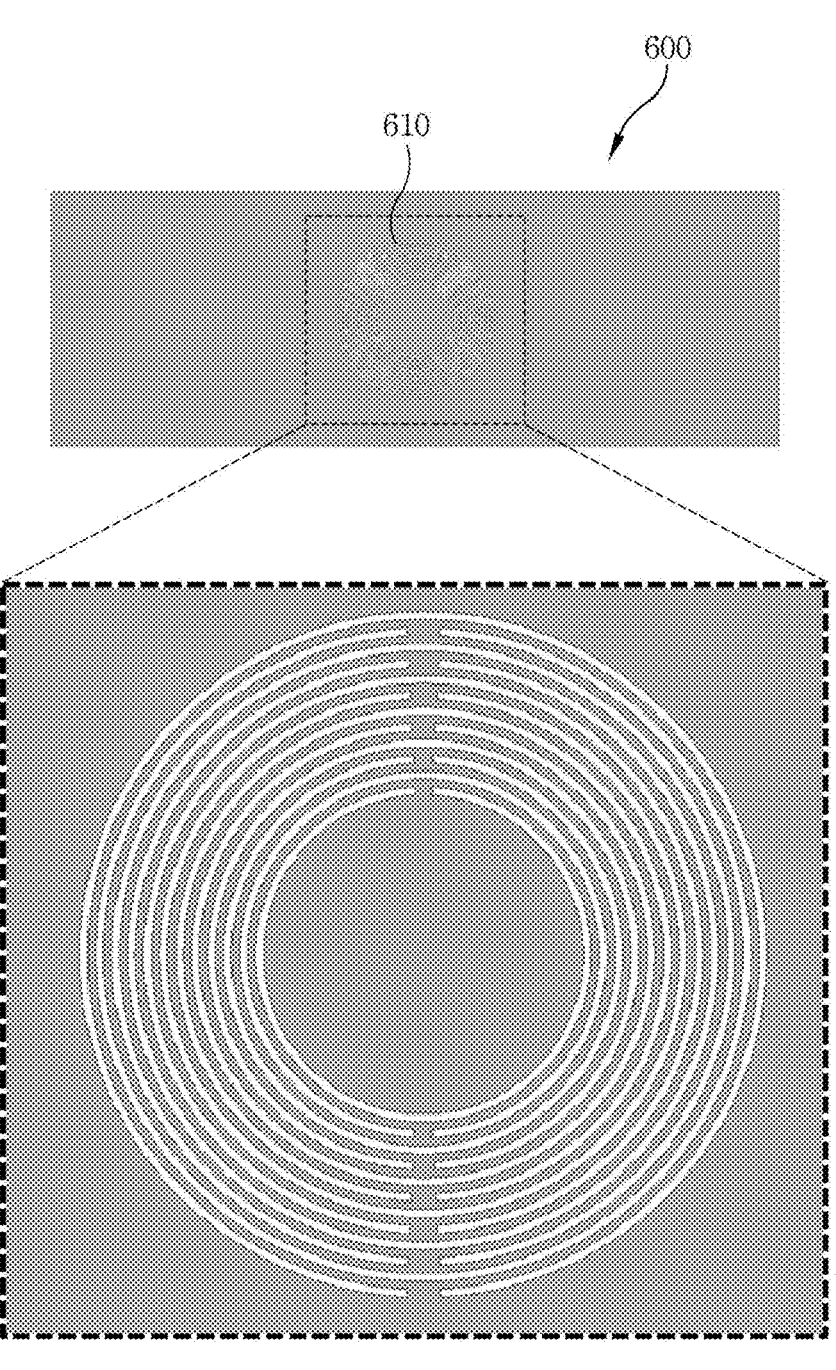
FIG. 6 is a plan view showing a resonant layer of a microplastic concentration measurement sensor according to an embodiment of the present disclosure.

The resonant layer 600 may include a metamaterial pattern 610. FIG. 6 shows in detail the resonant layer 600 having the metamaterial pattern 610.

The metamaterial pattern 610 has a plurality of ring-shaped spaces with the same center. Each ring-shaped space has a disconnected portion as shown. The disconnected portions of adjacent ring-shaped spaces are formed at opposite positions as shown.

The metamaterial pattern 610 designed as above can improve sensitivity to changes in dielectric properties.

Hereinafter, a microplastic concentration measurement system according to the present disclosure will be described. In the following description, detailed description of the above-described microplastic concentration measurement sensor 10 may be omitted.

Figure 7:
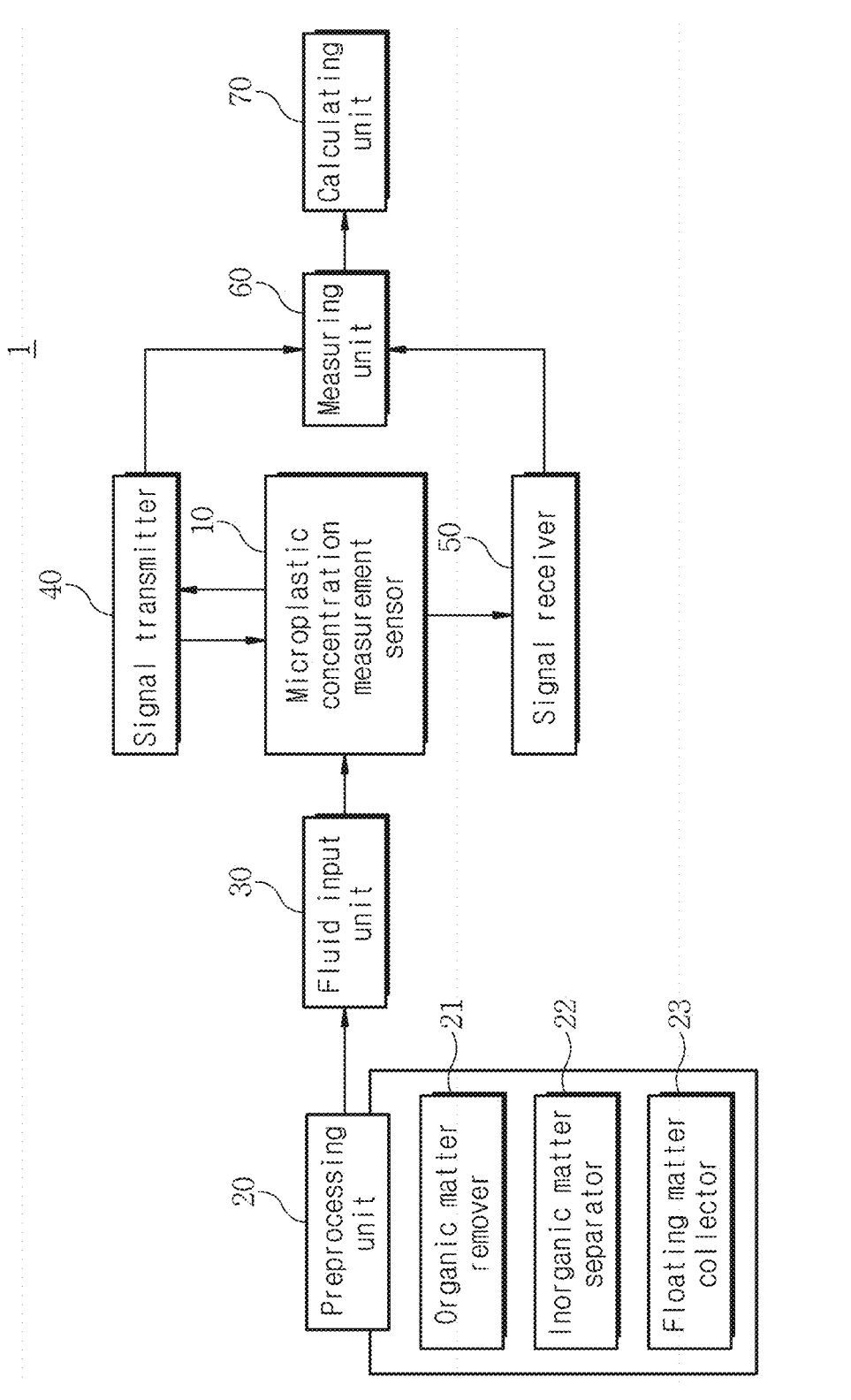
FIG. 7 is a block diagram showing a microplastic concentration measurement system according to an embodiment of the present disclosure.

FIG. 7 is a block diagram showing a microplastic concentration measurement system 1 according to an embodiment of the present disclosure.

The microplastic concentration measurement system 1 includes the above-described microplastic concentration measurement sensor 10, a preprocessing unit 20, a fluid input unit (or a fluid supplier) 30, a signal transmitter 40, a signal receiver 50, a measuring unit (or a measuring processor or a signal meter) 60, and a calculation unit (or a calculation processor) 70.

The preprocessing unit 20 preprocesses the fluid to make it suitable for measurement by the microplastic concentration measurement sensor 10. The preprocessing unit 20 may perform pretreatment to remove organic and inorganic matters from the fluid.

The fluid input unit 30 supplies the fluid preprocessed by the preprocessing unit 20 to the second through-hole 310 located above one end of the microfluidic channel 110. That is, the preprocessed fluid is supplied to the second through-hole 310 that communicates with the injection line portion 111 of the microfluidic channel 110.

The signal transmitter 40 is connected to one end of the single line 400 and transmits an RF signal to the single line 400. The signal receiver 50 is connected to the other end of the single line 400 and receives the RF signal passing through the single line 400.

The measuring unit 60 measures signals from the signal transmitter 40 and the signal receiver 50. The calculating unit 70 calculates the concentration of microplastic using the signals measured by the measuring unit 60.

The microplastic concentration measurement system 1 can calculate the concentration of microplastic using the characteristics of the RF signal that varies depending on the microplastic in the fluid passing through the microplastic concentration measurement sensor 10.

The calculating unit 70 is provided with a storage where the concentration of microplastic according to the characteristics of the RF signal is stored. The calculating unit 70 can calculate the concentration of microplastic by comparing the signal characteristics measured by the measuring unit 60 and data stored in the storage. The data stored in the storage can be obtained by passing the fluid with a known microplastic concentration through the microplastic concentration measurement sensor 10 and measuring the RF signal.

Specifically, the preprocessing unit 20 may include an organic matter remover 21, an inorganic matter separator 22, and a floating matter collector 23.

The organic matter remover 21 removes organic matter from the fluid by mixing a solute such as hydrogen peroxide with the fluid to decompose the organic matter.

The inorganic matter separator 22 performs specific gravity separation on the fluid that has passed the organic matter remover 21. That is, the inorganic matter separator 22 mixes a density separation liquid with the fluid and separates the inorganic matter and the microplastic using specific gravity. In this case, the microplastic having a low specific gravity floats onto the fluid.

The floating matter collector 23 collects the floating microplastic from the fluid in the inorganic matter separator 22. That is, the floating matter collector 23 collects the microplastic by sucking a surface portion of the fluid in the inorganic matter separator 22.

As such, when the fluid is preprocessed in the preprocessing unit 20, particles other than the microplastic can be removed from the fluid, and changes in dielectric properties caused by such particles other than the microplastic can be minimized. As a result, the accuracy of measuring microplastic concentration can be improved.

The fluid input unit 30 mixes the dispersion liquid with the floating microplastic collected by the floating matter collector 23 and supplies the mixture to the second through-hole 310.

The dispersion liquid can serve to disperse the microplastic within the fluid without agglomeration. Accordingly, it is possible to prevent the characteristics of the RF signal from changing depending on the measurement time. As a result, it is possible to improve the accuracy of microplastic concentration measurement.

The dispersion liquid can be made, for example, by mixing a surfactant in ethanol.

The calculating unit 70 can calculate the concentration of microplastic by checking the resonance frequency shift of the signal received from the signal receiver 50. The resonance frequency shift can be determined by comparing the input value of the RF signal and the transmission value of the RF signal and thereby identifying the transmission coefficient. The lower the resonance frequency, the higher the concentration of microplastic.

In addition, the calculating unit 70 can determine the type of microplastic by checking the reflection coefficient of the transmitted signal. The reflection coefficient can be identified by comparing the input value and reflection value of the RF signal. The dielectric constant and the loss tangent value vary depending on the type of microplastic in the microfluidic channel 110 and affect the reflection coefficient of the RF signal. Therefore, it is possible to determine the type of microplastic by identifying the reflection coefficient of the RF signal.

It is preferable that the fluid input unit 30 supplies the fluid to the second through-hole 310 at a constant pressure.

The amount of microplastic captured within the microfluidic channel 110 may vary depending on the pressure of the fluid passing through the microfluidic channel 110. Therefore, it is possible to accurately calculate the concentration of microplastic only when the pressure of the fluid supplied to the microfluidic channel 110 is kept constant.

In addition to the above-described components, the microplastic concentration measurement system 1 according to the present disclosure may further include at least one of a controller (not shown), an input unit (not shown), an output unit (not shown), and the like. The controller controls the microplastic concentration sensor 10, the preprocessing unit 20, the fluid input unit 30, the signal transmitter 40, the signal receiver 50, the measuring unit 60, and the calculating unit 70. The input unit inputs a control signal for the microplastic concentration sensor 10 or the like. The output unit outputs the operating status of the microplastic concentration sensor 10 and the calculation result from the calculating unit 70.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A microplastic concentration measurement sensor comprising:

a fluidic channel layer comprising a microfluidic channel formed on an upper surface thereof, the microfluidic channel comprising a first end and a second end;

a molding layer formed on the fluidic channel layer and comprising a plurality of first through-holes located respectively above the first end and the second end of the microfluidic channel;

a first substrate layer formed on the molding layer and comprising a plurality of second through-holes located respectively above the first through-holes;

a single line formed on an upper surface of the first substrate layer, wherein the single line is configured to receive an RF signal at one end;

a second substrate layer formed below the fluidic channel layer; and a resonant layer formed on a lower surface of the second substrate layer.

2. The microplastic concentration measurement sensor of claim 1, wherein the microfluidic channel includes:

an injection line portion forming one part of the microfluidic channel and having a generally straight line shape, a discharge line portion forming another part of the microfluidic channel and shaped like a straight line, and an expanded portion connecting the injection line portion and the discharge line portion and formed to have a larger width than the injection line portion and the discharge line portion.

3. The microplastic concentration measurement sensor of claim 2, wherein the microfluidic channel further includes:
a filter wall formed at least at a connection part with the discharge line portion in the expanded portion.

4. The microplastic concentration measurement sensor of claim 3, wherein the filter wall includes a plurality of filter rods spaced apart from an inner surface of the expanded portion and arranged at regular intervals from each other.

5. The microplastic concentration measurement sensor of claim 2, further comprising:
a pump connected to at least one of the injection line portion and the discharge line portion.

6. The microplastic concentration measurement sensor of claim 2, wherein a portion of the single line located above the expanded portion has a larger width than other portions of the single line.

7. The microplastic concentration measurement sensor of claim 1, wherein the resonant layer includes a metamaterial pattern.

8. A microplastic concentration measurement system comprising:
the microplastic concentration measurement sensor of claim 1;
a preprocessor configured to preprocess a fluid;
a fluid supplier configured to supply the preprocessed fluid to the second through-hole located above the first end of the microfluidic channel;
a signal transmitter connected to a first end of the single line and configured to transmit an RF signal to the single line;

a signal receiver connected to a second end of the single line and configured to receive the RF signal passing through the single line;
a measuring processor configured to measure signals from the signal transmitter and the signal receiver; and
a calculation processor configured to calculate concentration of microplastic based on the measured signals.

9. The microplastic concentration measurement system of claim 8, wherein the preprocessor includes:
an organic matter remover configured to remove organic matter from the fluid,
an inorganic matter separator configured to perform specific gravity separation on the fluid that has passed the organic matter remover, and
a floating matter collector configured to collect a floating microplastic from the fluid in the inorganic matter separator.

10. The microplastic concentration measurement system of claim 9, wherein the fluid supplier is configured to mix a dispersion liquid with the floating microplastic collected by the floating matter collector and supply a mixture to the second through-hole.

11. The microplastic concentration measurement system of claim 8, wherein the calculation processor is configured to calculate the concentration of microplastic by checking a resonance frequency shift of the received signal.

12. The microplastic concentration measurement system of claim 8, wherein the calculation processor is configured to determine the type of microplastic by checking a reflection coefficient of the transmitted signal.

13. The microplastic concentration measurement system of claim 8, wherein the fluid supplier is configured to supply the fluid to the second through-hole at a constant pressure.

* * * * *